(12) United States Patent
Kurihashi et al.

(10) Patent No.: US 11,159,770 B2
(45) Date of Patent: Oct. 26, 2021

(54) SERVER, VEHICLE IMAGE CAPTURING SYSTEM, AND VEHICLE IMAGE CAPTURING METHOD

(71) Applicant: TOYOTA JIDOSHA KABUSHIKI KAISHA, Toyota (JP)

(72) Inventors: Sui Kurihashi, Susono (JP); Yoshihiro Sakayanagi, Mishima (JP); Koichi Asamoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/389,000

(22) Filed: Apr. 19, 2019

(65) Prior Publication Data

US 2019/0349552 A1 Nov. 14, 2019

(30) Foreign Application Priority Data

May 14, 2018 (JP) .............................. JP2018-093219

(51) Int. Cl.
| | | |
|---|---|---|
| *B60R 11/04* | (2006.01) | |
| *B60R 25/102* | (2013.01) | |
| *H04W 4/44* | (2018.01) | |
| *H04W 4/02* | (2018.01) | |
| *H04N 7/18* | (2006.01) | |

(Continued)

(52) U.S. Cl.
CPC ............ *H04N 7/181* (2013.01); *G06Q 20/325* (2013.01); *G06T 11/60* (2013.01); *H04L 67/12* (2013.01);

(Continued)

(58) Field of Classification Search
CPC .............. H04N 7/181; H04N 5/23299; H04N 5/23218; H04N 5/247; G07C 5/008;
(Continued)

(56) References Cited

U.S. PATENT DOCUMENTS 9,505,383 B2 * 11/2016 Peel ..................... G05D 1/0038
2014/0156104 A1 * 6/2014 Healey ..................... G07C 5/00
701/1

(Continued)

FOREIGN PATENT DOCUMENTS

| JP | 4375155 B2 | 12/2009 |
| JP | 2016-092614 A | 5/2016 |
| WO | 2017/119737 A1 | 7/2017 |

*Primary Examiner* — Albert Kir
(74) *Attorney, Agent, or Firm* — Oliff PLC

(57) ABSTRACT

A server 2 comprises a communication device 21 able to communicate with terminals 31 of a plurality of vehicles 3, a storage device 22 storing identification information and positional information of the plurality of vehicles, and a control device 24. The control device is configured to receive capture request information input to the terminal by a party desiring image capture, select an image capturing vehicle for capturing an image of a vehicle to be captured designated by the party desiring image capture from among the plurality of vehicles based on the capture request information, the identification information and the positional information, generate image data based on a captured image of the vehicle to be captured acquired by a vehicle-mounted camera of the image capturing vehicle, and provide the image data to the party desiring image capture.

16 Claims, 11 Drawing Sheets

(51) Int. Cl.
  *H04L 29/08* (2006.01)
  *H04N 5/232* (2006.01)
  *H04N 5/247* (2006.01)
  *G06T 11/60* (2006.01)
  *G06Q 20/32* (2012.01)
  *H04W 4/46* (2018.01)

(52) U.S. Cl.
  CPC ..... *H04N 5/23218* (2018.08); *H04N 5/23299* (2018.08); *H04N 5/247* (2013.01); *H04W 4/023* (2013.01); *B60R 11/04* (2013.01); *H04W 4/46* (2018.02)

(58) Field of Classification Search
  CPC ............ G07C 5/00; H04L 67/12; H04W 4/44; H04W 4/023; H04W 4/46; G06Q 20/325; G06T 11/60; B60R 11/04
  USPC .............................................. 348/148; 701/1
  See application file for complete search history.

(56) References Cited

U.S. PATENT DOCUMENTS

| | | | |
|---|---|---|---|
| 2015/0381919 A1* | 12/2015 | Yamashiro | B60R 11/04 348/148 |
| 2017/0208294 A1 | 7/2017 | Kawamura et al. | |
| 2018/0053413 A1* | 2/2018 | Patil | G01S 11/14 |
| 2018/0136655 A1* | 5/2018 | Kim | H04W 4/44 |
| 2018/0260485 A1* | 9/2018 | Nakata | H04L 67/12 |
| 2018/0301034 A1* | 10/2018 | Morita | G01C 21/3602 |
| 2019/0012908 A1* | 1/2019 | Chun | G07C 5/008 |
| 2020/0312155 A1* | 10/2020 | Kelkar | G08G 1/096758 |

* cited by examiner

SERVER, VEHICLE IMAGE CAPTURING SYSTEM, AND VEHICLE IMAGE CAPTURING METHOD

FIELD

The present invention relates to a server, vehicle image capturing system, and vehicle image capturing method.

BACKGROUND

In the past, it has been known to install a camera in a vehicle for assisting a driver of the vehicle. To make effective use of such a vehicle-mounted camera, applications besides driver assistance of a vehicle are being studied.

For example, in the vehicle-mounted camera system described in PTL 1, a vehicle-mounted camera is used for monitoring the surroundings of the vehicle when the power switch of the vehicle is turned off. Further, when occurrence of an emergency situation is detected as well, the vehicle-mounted camera is used for recording the state inside and outside of the vehicle.

CITATION LIST

Patent Literature

[PTL 1] Japanese Unexamined Patent Publication No. 2016-092614

SUMMARY

Technical Problem

In this regard, persons newly purchasing vehicles, person fancying up vehicles, persons owning rare vehicles, etc. sometimes desire to capture images of their own vehicles when being driven. Further, car fans desire to capture images of luxury cars, classic cars, and other rare vehicles. However, in the vehicle-mounted camera system described in PTL 1, the vehicle-mounted camera is only used for preventing vehicle theft and determining the cause of accidents. Use of the vehicle-mounted camera to generate a desired vehicle image is not envisioned.

Therefore, an object of the present invention is to provide a desired vehicle image to a party desiring image capture using a vehicle-mounted camera.

Solution to Problem

The summary of the present disclosure is as follows.

(1) A server comprising a communication device able to communicate with terminals of a plurality of vehicles, a storage device storing identification information and positional information of the plurality of vehicles, and a control device, wherein the control device is configured to receive capture request information input to the terminal by a party desiring image capture, select an image capturing vehicle for capturing an image of a vehicle to be captured designated by the party desiring image capture from among the plurality of vehicles based on the capture request information, the identification information and the positional information, generate image data based on a captured image of the vehicle to be captured acquired by a vehicle-mounted camera of the image capturing vehicle, and provide the image data to the party desiring image capture.

(2) The server described in above (1), wherein the control device is configured to give a driving instruction to the image capturing vehicle so that the image capturing vehicle recognizes the vehicle to be captured.

(3) The server described in above (1) or (2), wherein the control device is configured to process payment between a capture cooperating vehicle cooperating with an image capture operation of the vehicle to be captured and the vehicle of the party desiring image capture.

(4) The server described in above (3), wherein the control device is configured to change compensation given to the capture cooperating vehicle in accordance with at least one of a quality and quantity of captured images of the vehicle to be captured.

(5) The server described in any one of above (1) to (4), wherein the control device is configured to edit a captured image of the vehicle to be captured and information acquired at the vehicle to be captured when the vehicle to be captured is captured by the vehicle-mounted camera of the image capturing vehicle to generate the image data.

(6) The server described in above (5), wherein the information includes an interior image of the vehicle to be captured acquired by the vehicle-mounted camera of the vehicle to be captured.

(7) The server described in any one of above (1) to (6), wherein the control device is configured to select two vehicles other than the vehicle to be captured as the image capturing vehicles.

(8) A vehicle image capturing system comprising a plurality of vehicles, each equipped with a vehicle-mounted camera and a terminal, and comprising a server, wherein the server comprises a communication device able to communicate with terminals of a plurality of vehicles, a storage device storing identification information and positional information of the plurality of vehicles, and a control device, and the control device is configured to receive capture request information input to the terminal by a party desiring image capture, select an image capturing vehicle for capturing an image of a vehicle to be captured designated by the party desiring image capture from among the plurality of vehicles based on the capture request information, the identification information and the positional information, generate image data based on a captured image of the vehicle to be captured acquired by the vehicle-mounted camera of the image capturing vehicle, and provide the image data to the party desiring image capture.

(9) A vehicle image capturing method comprising storing identification information and positional information of a plurality of vehicles, receiving capture request information input to a terminal of a vehicle by a party desiring image capture, selecting an image capturing vehicle for capturing an image of a vehicle to be captured designated by the party desiring image capture from among the plurality of vehicles based on the capture request information, the identification information and the positional information, generating image data based on a captured image of the vehicle to be captured acquired by a vehicle-mounted camera of the image capturing vehicle, and providing the image data to the party desiring image capture.

Advantageous Effects of Invention

According to the present invention, it is possible to provide a desired vehicle image to a party desiring image capture using a vehicle-mounted camera.

DESCRIPTION OF EMBODIMENTS

Figure 1:
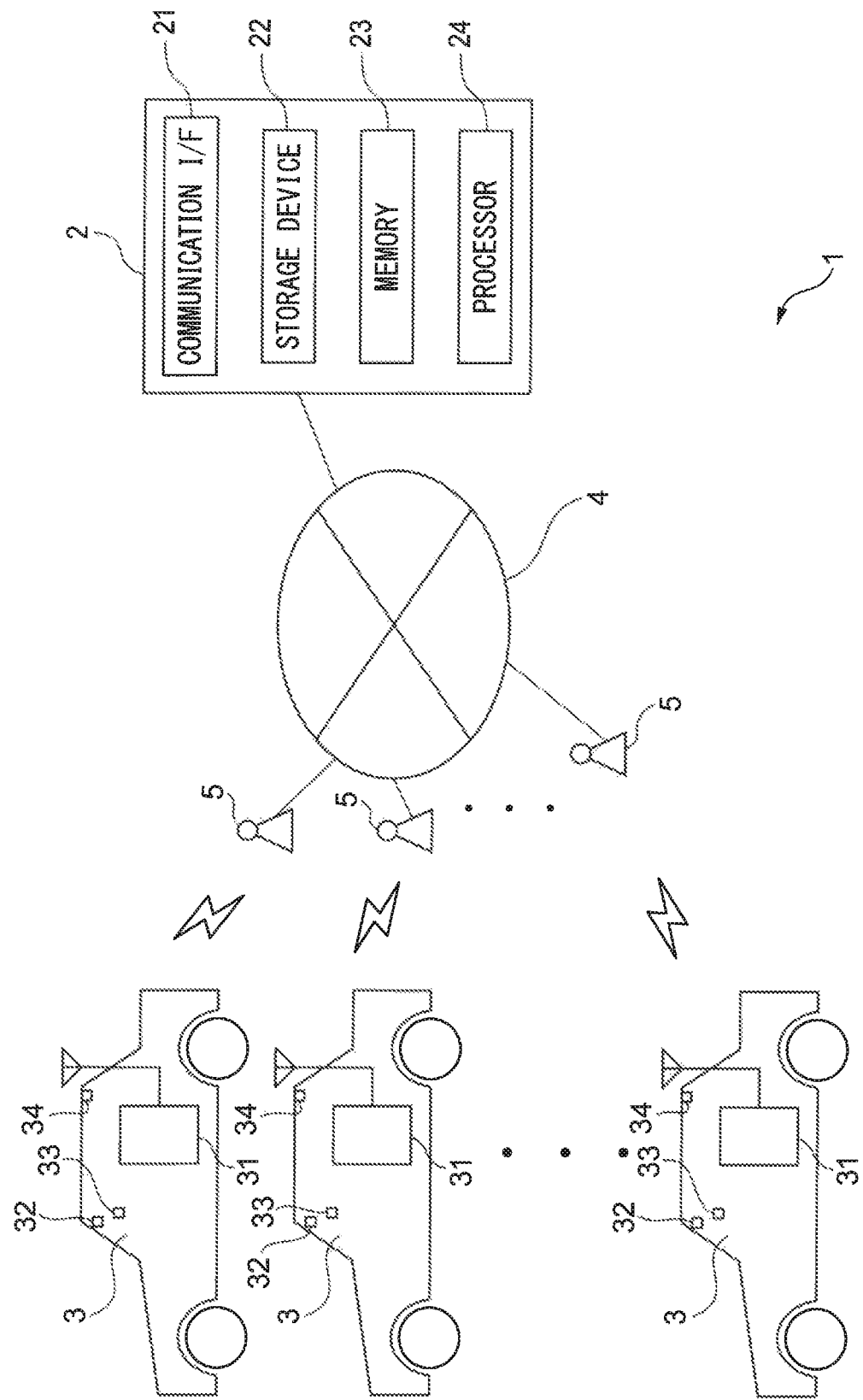
FIG. 1 is a schematic view of the configuration of a vehicle image capturing system according to a first embodiment of the present invention.

Below, referring to the drawings, a server, vehicle image capturing system, and vehicle image capturing method according to embodiments of the present invention will be explained. Note that, in the following explanation, similar component elements are assigned the same reference numerals.

First Embodiment

Below, referring to FIG. 1 to FIG. 7, a first embodiment of the present invention will be explained. FIG. 1 is a schematic view of the configuration of a vehicle image capturing system according to a first embodiment of the present invention. The vehicle image capturing system 1 is provided with a server 2 and a plurality of vehicles 3, and uses vehicle-mounted cameras of vehicles 3 to generate a vehicle image in accordance with an image capture request of a party desiring image capture.

Each of the plurality of vehicles 3 is provided with vehicle-mounted cameras and a terminal 31. The vehicle-mounted cameras can capture color still images and moving images. In the present embodiment, each vehicle 3 is provided with a front camera 32, cabin camera 33, and rear camera 34 as vehicle-mounted cameras mounted in the vehicle 3. The front camera 32 can capture an image of the area in front of the vehicle 3 and is for example provided at the back surface of a room mirror of the vehicle 3. The cabin camera 33 can capture an image of a predetermined region inside the cabin including the upper torso of the driver of the vehicle 3 and is for example provided at the top part of the steering column of the vehicle 3. The rear camera 34 can capture an image of the area at the rear of the vehicle 3 and is for example provided at the back part of the ceiling of the cabin. Note that, the vehicle 3 may be further provided with a right side camera able to capture an image of the area at the right side of the vehicle 3, a left side camera able to capture an image of the area at the left side of the vehicle 3, etc. as vehicle-mounted cameras.

The terminal 31 is a device able to communicate with the server 2 through a wireless base station 5 and a communication network 4. The terminal 31 for example accesses the wireless base station 5 connected through a gateway to the communication network 4 to be connected to the communication network 4 through the wireless base station 5. Further, the terminal 31 is connected through an internal vehicle network based on the CAN (Controller Area Network) standard etc. to be able to communicate with an electronic control unit (ECU) controlling the vehicle-mounted devices (vehicle-mounted cameras etc.) or with the vehicle-mounted devices. Note that, the terminal 31 may communicate with the server 2 through only the communication network 4 without going through the wireless base station 5.

The terminal 31 is provided with a touch panel and microphone or other such input device and a touch panel and speaker or other such output device. The terminal 31 is for example a vehicle-mounted terminal provided in advance at the vehicle 3 (for example, a navigation system). Note that, the terminal 31 of the vehicle 3 may be a mobile terminal carried into the vehicle 3 by the driver or a passenger of the vehicle 3 (for example, a smart phone, tablet terminal, etc.)

The server 2 is provided with a communication interface 21, storage device 22, memory 23, and processor 24 and is, for example, connected through a gateway to the communication network 4. The communication interface 21, storage device 22, and memory 23 are connected through signal wires to the processor 24. Note that, the server 2 may be further provided with a keyboard and mouse or other such input device and a display or other such output device etc.

The communication interface 21 has an interface circuit for connecting the server 2 to the communication network 4 and can communicate with the terminals 31 of the plurality of vehicles 3 through the communication network 4. The communication interface 21 receives various signals from the terminals 31 and transmits the received signals to the processor 24. Further, the communication interface 21 outputs commands from the processor 24 for the terminals 31 to the communication network 4. The communication interface 21 is one example of a communication device.

The storage device 22 has, for example, a hard disk drive (HDD), solid state drive (SDD), or optical storage medium. The storage device 22 stores various types of data and, for example, stores identification information and positional information of the plurality of vehicles 3. The identification information of the vehicles 3 is, for example, the previously registered license plate numbers of the vehicles 3. Note that, the identification information of the vehicles 3 may be MAC addresses assigned to terminals 31 of the vehicles 3.

Further, the terminal 31 transmits the current position of the corresponding vehicle 3 as positional information of the vehicle 3 every predetermined time to the server 2 while the ignition switch of the corresponding vehicle 3 is on. The current position of the vehicle 3 (for example, the latitude and longitude of the vehicle 3) is for example detected by a GPS receiver provided at the terminal 31 or a device able to communicate with the terminal 31. If the current position of the vehicle 3 is transmitted to the server 2, the positional information of the vehicle 3 stored in the storage device 22 is updated. The storage device 22 is one example of a memory device.

Note that, the storage device 22 may store identification information and positional information of vehicles 3 only for vehicles 3 able to cooperate in image capture. Whether or not they can cooperate in image capture is for example set in advance by the drivers of the vehicles 3 through the terminals 31. Further, the storage device 22 stores map information and computer programs for the processor 24 to perform various processing. Note that, the computer programs may be recorded on optical storage media or magnetic storage media or other such storage media and be distributed.

The memory 23, for example, has a semiconductor memory such as a random access memory (RAM). The memory 23 stores various types of data generated by the processor 24 performing various types of processing etc.

The processor 24 has one or more CPUs (central processing units) and their peripheral circuits and performs various types of processing. Note that, the processor 24 may further have processing circuits such as arithmetic logic units or numerical calculation units. The processor 24 is one example of a control device.

When a party desiring image capture desires to capture an image of a desired vehicle, the inputs capture request information into the terminal and transmits the capture request information through the terminal to the server 2. The processor 24 of the server 2 receives the capture request information through the communication interface 21. When receiving the capture request information, the processor 24 selects an image capturing vehicle for capturing an image of the vehicle to be captured designated by the party desiring image capture from among the plurality of vehicles based on the capture request information and the identification information and positional information of the vehicles stored in the storage device 22. When receiving the captured image of the vehicle to be captured acquired by the vehicle-mounted cameras of the image capturing vehicle, the processor 24 generates image data based on the captured image of the vehicle to be captured and provides the image data to the party desiring image capture. Therefore, according to the vehicle image capturing system 1 or the server 2, it is possible to use the vehicle-mounted camera to provide the desired vehicle image to the party desiring image capture.

Figure 2:
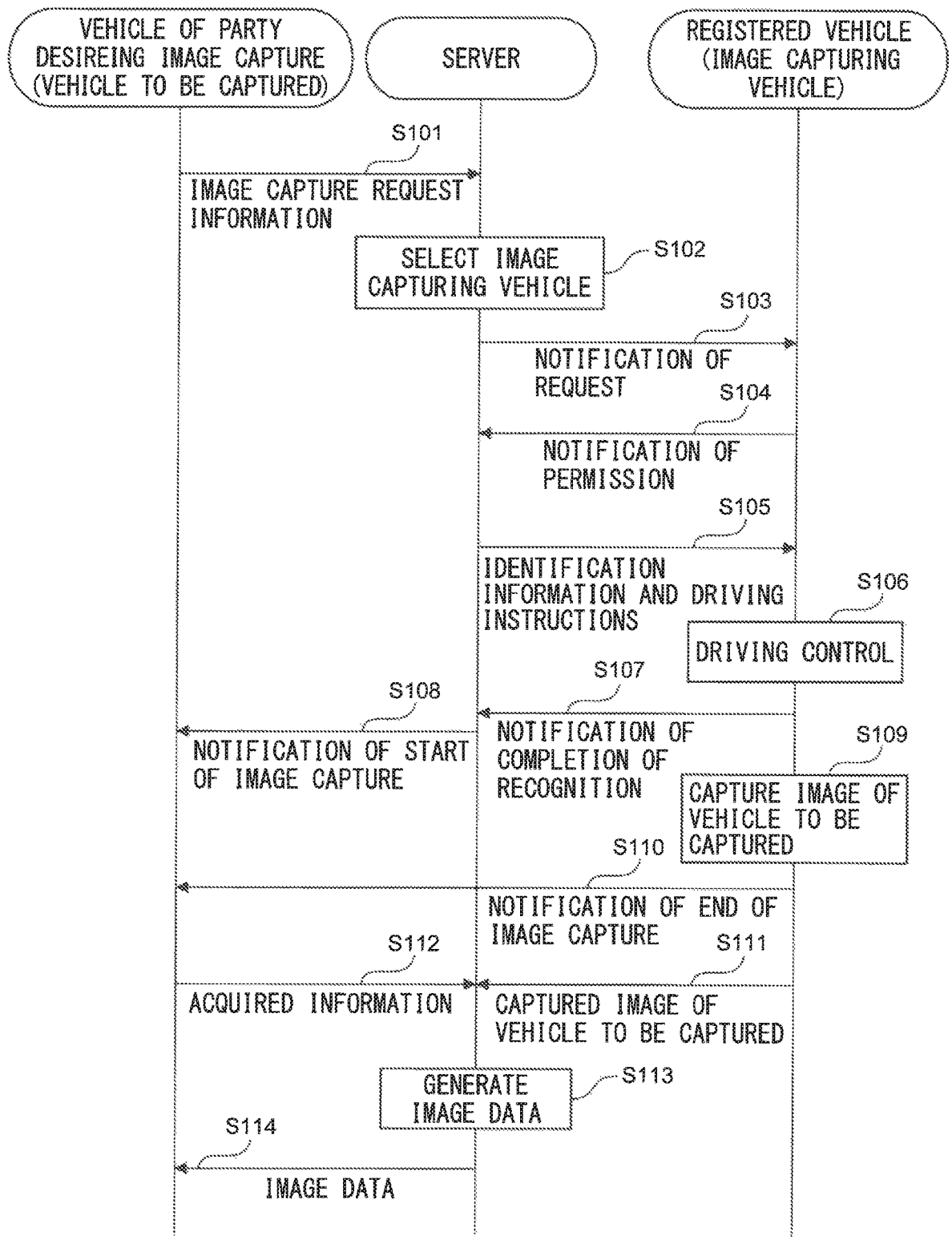
FIG. 2 is a sequence diagram showing an example of operation of a vehicle image capturing system according to the first embodiment of the present invention.

FIG. 2 is a sequence diagram showing an example of operation of a vehicle image capturing system 1 according to the first embodiment of the present invention. Note that, in this sequence diagram, the communication between the server 2 and the vehicle of the party desiring image capture and the communication between the server 2 and a registered vehicle are performed through the communication interface 21 of the server 2, the communication network 4, and the terminals of the vehicles. Further, the processing by the server 2 is performed by the processor 24 of the server 2.

In the example of FIG. 2, the party desiring image capture desires that another vehicle capture an image of his own vehicle while being driven. That is, the vehicle of the party desiring image capture corresponds to the "vehicle to be captured", while a vehicle of other than the party desiring image capture corresponds to the "image capturing vehicle". Further, the image capturing vehicle corresponds to a "capture cooperating vehicle" cooperating in the image capture operation of the vehicle to be captured.

First, the party desiring image capture operates the terminal of the vehicle of the party desiring image capture to input capture request information to the terminal. The vehicle of the party desiring image capture is one of the registered vehicles in which identification information and positional information of the vehicle are stored in the server 2.

If the capture request information is input, the terminal of the vehicle of the party desiring image capture transmits the capture request information to the server 2 (step S101). The capture request information includes designation of the vehicle to be captured (own vehicle or other vehicle), identification information of the vehicle to be captured, identification information of the vehicle of the party desiring image capture, desired time of image capture, desired number of image capturing vehicles, etc. In this example, the vehicle of the party desiring image capture corresponds to the "vehicle to be captured", so the identification information of the vehicle to be captured and the identification information of the vehicle of the party desiring image capture are the same.

When the server 2 receives the capture request information from the terminal of the vehicle of the party desiring image capture, it selects an image capturing vehicle from among the plurality of registered vehicles (step S102). For example, the server 2 selects the image capturing vehicle from among the registered vehicles at a distance to the vehicle to be captured (the vehicle of the party desiring image capture) of a predetermined value or less and being driven along the same road as the vehicle to be captured based on the positional information of the registered vehicles, and selects the desired number of image capturing vehicles in order from the registered vehicle with closest distance to the vehicle to be captured.

Next, the server 2 requests capture cooperation to the capture cooperating vehicle. Specifically, the server 2 transmits a notification of request for capture cooperation to the terminal of a selected image capturing vehicle (step S103). As a result, the driver of the image capturing vehicle is notified of the request for capture cooperation through the terminal of the image capturing vehicle. If the driver of the image capturing vehicle inputs permission for capture cooperation to the terminal of the image capturing vehicle, the terminal of the image capturing vehicle transmits a notification of permission for capture cooperation to the server 2 (step S104).

If the server 2 receives a notification of permission, it gives the image capturing vehicle the identification information of the vehicle to be captured. Specifically, the server 2 transmits the identification information of the vehicle to be captured to the terminal of the image capturing vehicle (step S105). Further, the server 2 gives the image capturing vehicle driving instructions so that the image capturing vehicle recognizes the vehicle to be captured based on the positional information of the vehicle to be captured and the image capturing vehicle. Specifically, the server 2 transmits driving instructions to the terminal of the image capturing vehicle so that the distance between the image capturing vehicle and the vehicle to be captured becomes closer based on the positional information of the vehicle to be captured and the image capturing vehicle (step S105). As a result, driving instructions are transmitted through the terminal of the image capturing vehicle to the driver of the image capturing vehicle.

The driving instructions include instructions on the driving direction, instructions on acceleration and deceleration, etc. For example, when the vehicle to be captured is running at the front of the image capturing vehicle, the server 2 instructs the image capturing vehicle to accelerate within the legal speed limit. On the other hand, when the vehicle to be captured is running at the rear of the image capturing vehicle, the server 2 instructs the image capturing vehicle to decelerate. The driver of the image capturing vehicle controls the driving of the image capturing vehicle based on the driving instructions (step S106).

Note that, when the image capturing vehicle is an automated driving vehicle, the driving actuator of the image capturing vehicle is controlled in accordance with the driving instructions transmitted to the terminal of the image capturing vehicle. Further, the server 2 may give driving instructions to the vehicle to be captured as well in addition to the image capturing vehicle so that the image capturing vehicle recognizes the vehicle to be captured. Further, the server 2 may give the image capturing vehicle positional information of the vehicle to be captured in addition to the driving instructions and identification information of the vehicle to be captured. In this case, for example, map information and the current position of the vehicle to be captured are displayed to the driver of the image capturing vehicle through the terminal of the image capturing vehicle.

If the image capturing vehicle approaches the vehicle to be captured, the image capturing vehicle recognizes the vehicle to be captured. The terminal of the image capturing vehicle and the terminal of the vehicle to be captured can communicate with each other by vehicle-vehicle communication based on the RC006 base standard or IEEE802.11p, C2CCC, LTE-V2X, Bluetooth®, or other standard. For example, when the relative distance between the image capturing vehicle and the vehicle to be captured is calculated by vehicle-vehicle communication and the relative distance is equal to or less than a reference value, the terminal of the image capturing vehicle judges that the image capturing vehicle has recognized the vehicle to be captured. The reference value is determined in advance and is set to a distance enabling capture of an image of a vehicle to be captured by vehicle-mounted cameras of the image capturing vehicle. Note that, if the identification information of the vehicle is the license plate number, the terminal of the image capturing vehicle may judge that the image capturing vehicle has recognized the vehicle to be captured when the license plate number of the vehicle to be captured is detected by the vehicle-mounted cameras of the image capturing vehicle.

The terminal of the image capturing vehicle transmits a notification of completion of recognition to the server 2 when judging that the image capturing vehicle recognizes the vehicle to be captured (step S107). If the server 2 receives a notification of completion of recognition, it stops the driving instructions to the image capturing vehicle. Further, the server 2 transmits a notification of start of image capture to the terminal of the vehicle to be captured (step S108). As a result, start of image capture is notified to the party desiring image capture through the terminal of the vehicle to be captured.

Figure 3:
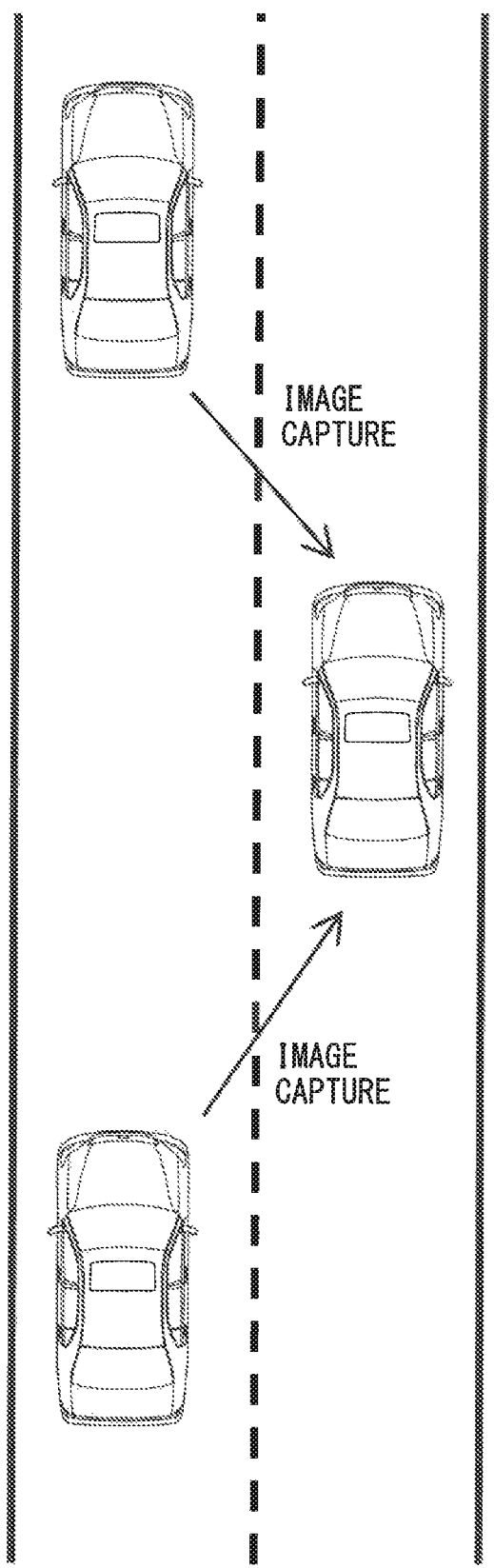
FIG. 3 is a view showing an example of a situation where an image of a vehicle to be captured is captured by a vehicle-mounted camera of an image capturing vehicle.

FIG. 3 is a view showing one example of situation where an image of a vehicle to be captured is captured by the vehicle-mounted cameras of image capturing vehicles. In this example, the vehicle to be captured is captured by two image capturing vehicles. As shown in FIG. 3, the image capturing vehicles recognize the vehicle to be captured, then drive to near the vehicle to be captured and use the vehicle-mounted cameras to capture images of the vehicle to be captured (step S109). The captured images of the vehicle to be captured acquired by the vehicle-mounted cameras of the image capturing vehicles are stored in the terminals of the image capturing vehicles.

If the desired time of image capture elapses from when image capture started, the terminal of an image capturing vehicle transmits a notification of end of image capture to the terminal of the vehicle to be captured by vehicle-vehicle communication (step S110). As a result, the end of image capture is notified to the party desiring image capture through the terminal of the vehicle to be captured. At this time, the end of image capture is notified to the driver of the image capturing vehicle as well through the terminal of the image capturing vehicle.

After the end of the image capture operation of the vehicle to be captured, the terminal of an image capturing vehicle transmits the captured image of the vehicle to be captured to the server 2 (step S11). Further, if the terminal of the vehicle to be captured receives a notification of end of image capture, it transmits to the server 2 the information acquired at the vehicle to be captured when the vehicle to be captured has been captured by the image capturing vehicle (step S112). The information acquired at the vehicle to be captured is stored in the terminal of the vehicle to be captured and includes for example the image of the scenery and the image of the interior of the vehicle to be captured acquired by the vehicle-mounted cameras of the vehicle to be captured and speed information etc. of the vehicle to be captured. The speed information is the image of a tachometer acquired by the vehicle-mounted cameras or the speed detected by a speed sensor.

Figure 4:
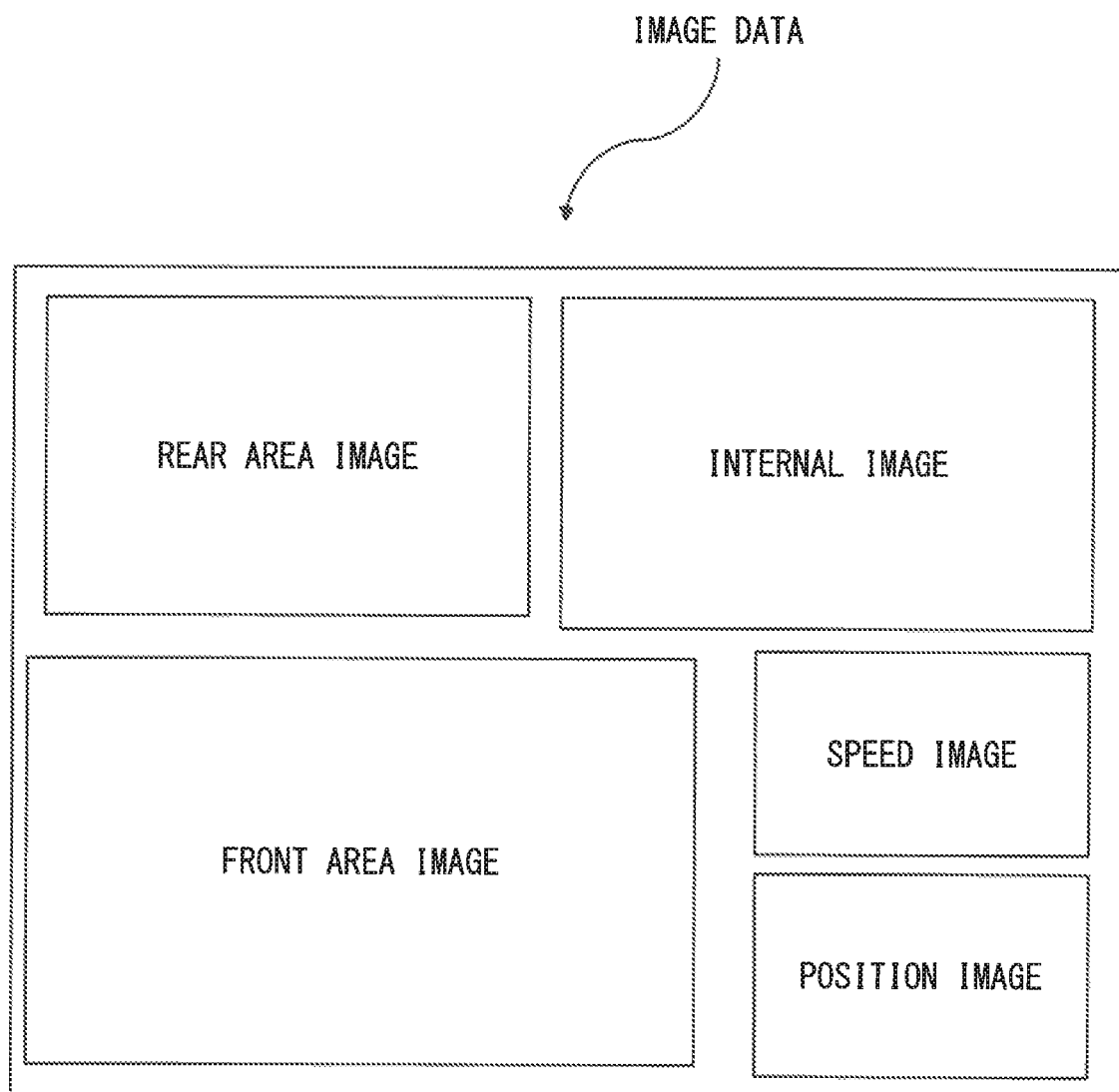
FIG. 4 is a view showing an example of image data generated by a server.

The server 2 edits the captured images of the vehicle to be captured received from the image capturing vehicles and the acquired information received from the vehicle to be captured to generate image data (step S113). FIG. 4 is a view showing an example of image data generated by the server 2. The image data is generated as a moving picture file. In this example, the image data includes a front area image, rear area image, interior image, speed image, and position image of the vehicle to be captured. The interior image, for example, includes the sight of passengers enjoying the drive. The speed image is for example the image of a number or the image of a tachometer. The image of the tachometer is an image acquired by the vehicle-mounted camera of the vehicle to be captured or an animation image generated based on the speed detected by a speed sensor. The position image is an image showing the driving position of the vehicle to be captured on for example a map. Note that, the image data may further include an image of the scenery etc., acquired by the vehicle-mounted cameras of the vehicle to be captured.

The server 2 provides the generated image data to the party desiring image capture. Specifically, the server 2 transmits the image data to the terminal of the party desiring image capture (step S114). The party desiring image capture can view the image data on the terminal. Further, the party desiring image capture can transfer the image data from the terminal to another device. Furthermore, the party desiring image capture can upload the image data directly from the terminal of the vehicle to be captured or from another device to an SNS (Social Networking Service).

Note that, the time of image capture and the number of image capturing vehicles may be constant values determined in advance. In this case, the desired time of image capture and the desired number of image capturing vehicles are not included in the capture request information. For example, the server 2 selects two vehicles other than the vehicle to be captured as the image capturing vehicles. By doing this, it is possible to easily secure the image capturing vehicles while acquiring a broad captured image of the vehicle to be captured.

Further, the server 2 may give driving instructions to an image capturing vehicle or an image capturing vehicle and the vehicle to be captured until the image capture operation of the vehicle to be captured ends. Further, the notification of start of image capture (step S108) may be directly transmitted by vehicle-vehicle communication from an image capturing vehicle to the vehicle to be captured. Further, a notification of end of image capture (step S110) may be transmitted from the server 2 to the terminals of the image capturing vehicle and the vehicle to be captured when the desired time of image capture elapses from when the image capture operation of the vehicle to be captured is started.

Further, the captured image of the vehicle to be captured may be transmitted substantially in real time from the terminal of an image capturing vehicle to the server 2 without being stored in the terminal of the image capturing vehicle. Similarly, the information acquired at the vehicle to be captured may be transmitted substantially in real time from the terminal of the vehicle to be captured to the server 2 without being stored in the terminal of the vehicle to be captured.

Further, the server 2 may store the image data in the storage device 22 or transmit the image data to a cloud server other than the server 2 to thereby provide the party desiring image capture with the image data. In this case, the party desiring image capture can access the image data through the communication network 4. Further, the party desiring image capture can download the image data through the communication network 4 to a mobile terminal or personal computer.

Further, the information acquired at the vehicle to be captured may not be transmitted to the server 2. In this case, the server 2 generates image data based only on the captured images of the vehicle to be captured. Note that, in this case as well, a speed image and position image generated based on speed information and positional information acquired by the image capturing vehicle may also be included in the image data.

Figure 5:
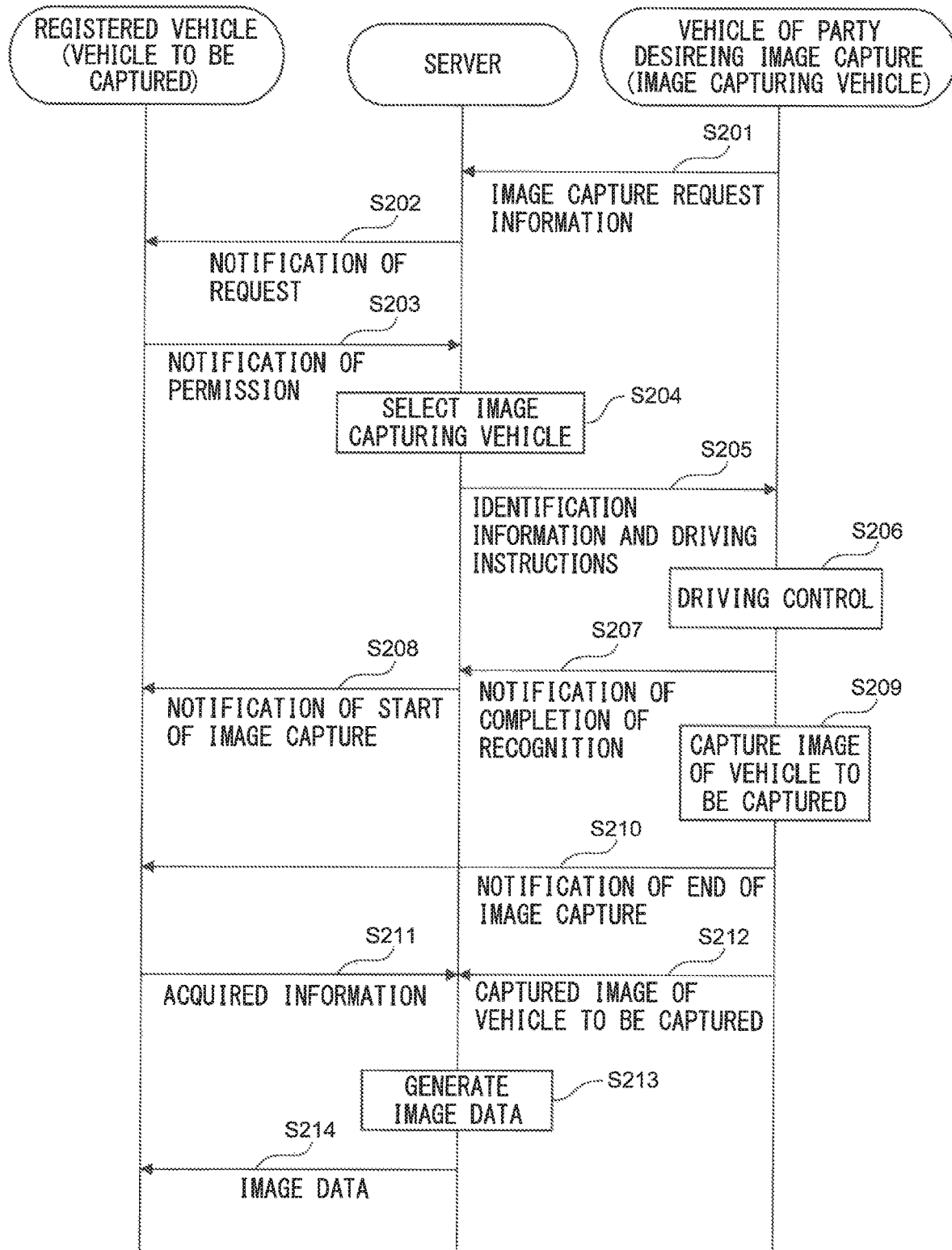
FIG. 5 is a sequence diagram showing another example of operation of a vehicle image capturing system according to the first embodiment of the present invention.

FIG. 5 is a sequence diagram showing another example of operation of the vehicle image capturing system 1 according to the first embodiment of the present invention. In the example of FIG. 5, the party desiring image capture desires to use his own vehicle to capture the image of another vehicle being driven. That is, the vehicle of the party desiring image capture corresponds to an "image capturing vehicle", while a vehicle of other than the party desiring image capture corresponds to the "vehicle to be captured". Further, the vehicle to be captured corresponds to a "capture cooperating vehicle" cooperating with the image capture operation of the vehicle to be captured.

First, the party desiring image capture operates the terminal of the vehicle of the party desiring image capture to input capture request information to the terminal. The vehicle of the party desiring image capture is one of the registered vehicles in which vehicle identification information and positional information are stored in the server 2. If capture request information is input, the terminal of the vehicle of the party desiring image capture transmits the capture request information to the server 2 (step S201).

The capture request information includes designation of the vehicle to be captured (own vehicle or other vehicle), identification information of the vehicle to be captured, identification information of the vehicle of the party desiring image capture, desired time of image capture, desired number of image capturing vehicles, etc. The terminal of the vehicle of the party desiring image capture for example acquires identification information of the vehicle to be captured by vehicle-vehicle communication. Note that, if identification information of the vehicle to be captured is the license plate number, the terminal of the vehicle of the party desiring image capture may acquire identification information of the vehicle to be captured by input from the party desiring image capture.

When the server 2 receives capture request information from the terminal of the vehicle of the party desiring image capture, the server 2 requests capture cooperation to the capture cooperating vehicle. Specifically, the server 2 transmits a notification of request of capture cooperation to the terminal of the vehicle to be captured (step S202). As a result, the request for capture cooperation is notified to the driver of the vehicle to be captured through the terminal of the vehicle to be captured. If the driver of the vehicle to be captured inputs permission for capture cooperation to the terminal of the vehicle to be captured, the terminal of the vehicle to be captured transmits a notification of permission for capture cooperation to the server 2 (step S203).

The server 2 selects an image capturing vehicle when receiving a notification of permission from the terminal of the vehicle to be captured (S204). In this example, image capture by only the vehicle of the party desiring image capture is desired, so the server 2 selects only the vehicle of the party desiring image capture as the image capturing vehicle. After that, in the same way as step S105 to step S114 of FIG. 2, step S205 to step S214 are performed. Note that, the processing shown in FIG. 5 can be modified in the same way as the processing shown in FIG. 2.

Further, in the example of FIG. 5, the vehicle to be captured is another vehicle, so the image of the passengers of the vehicle to be captured is not included in the image data. For this reason, if the image data includes an image of the cabin interior of the vehicle to be captured, only the interior decoration of the vehicle to be captured is shown in the image of the cabin interior.

Figure 6:
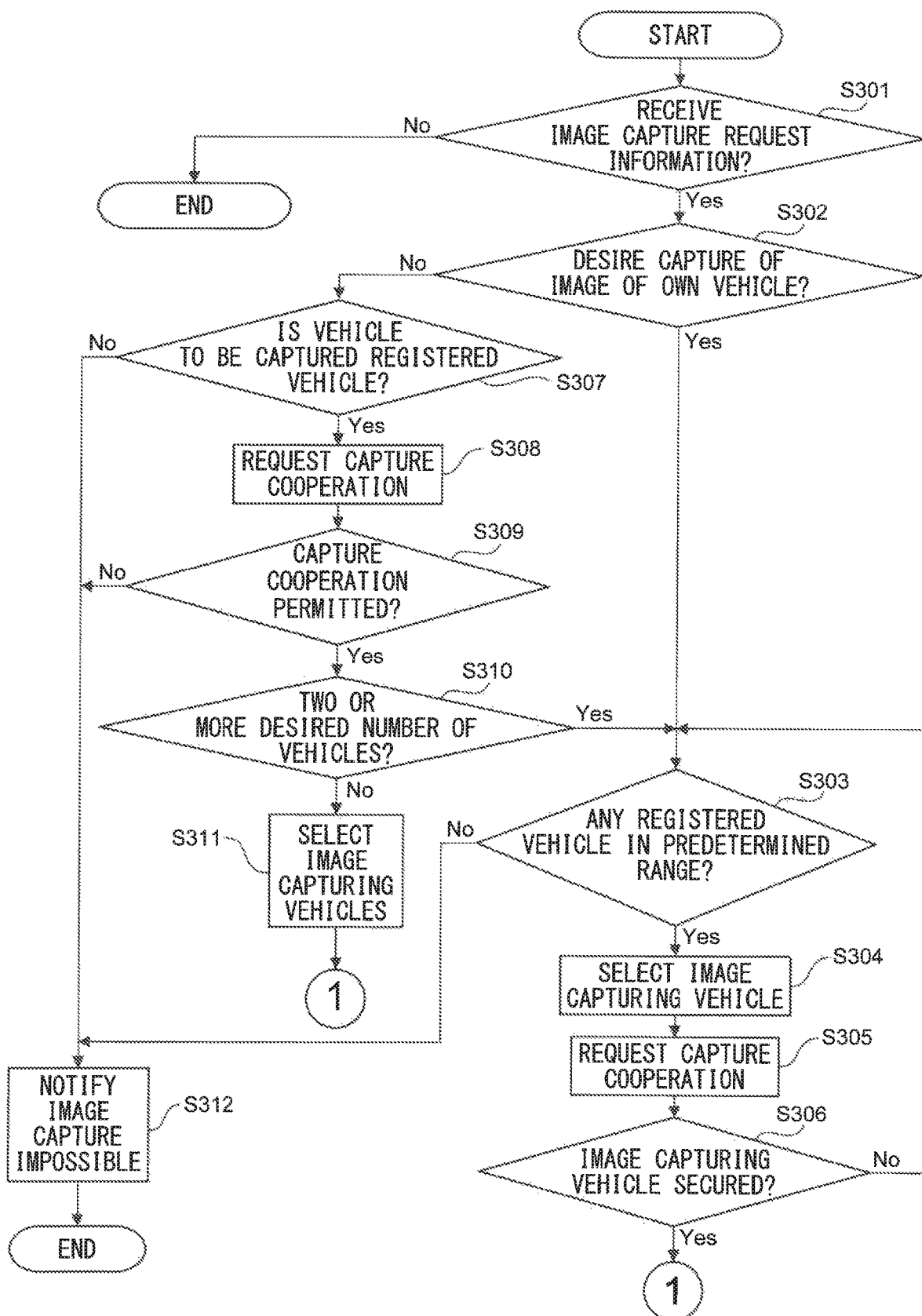
FIG. 6 is a flow chart showing a control routine of processing performed by a server when image data is generated in accordance with an image capture request.
Figure 7:
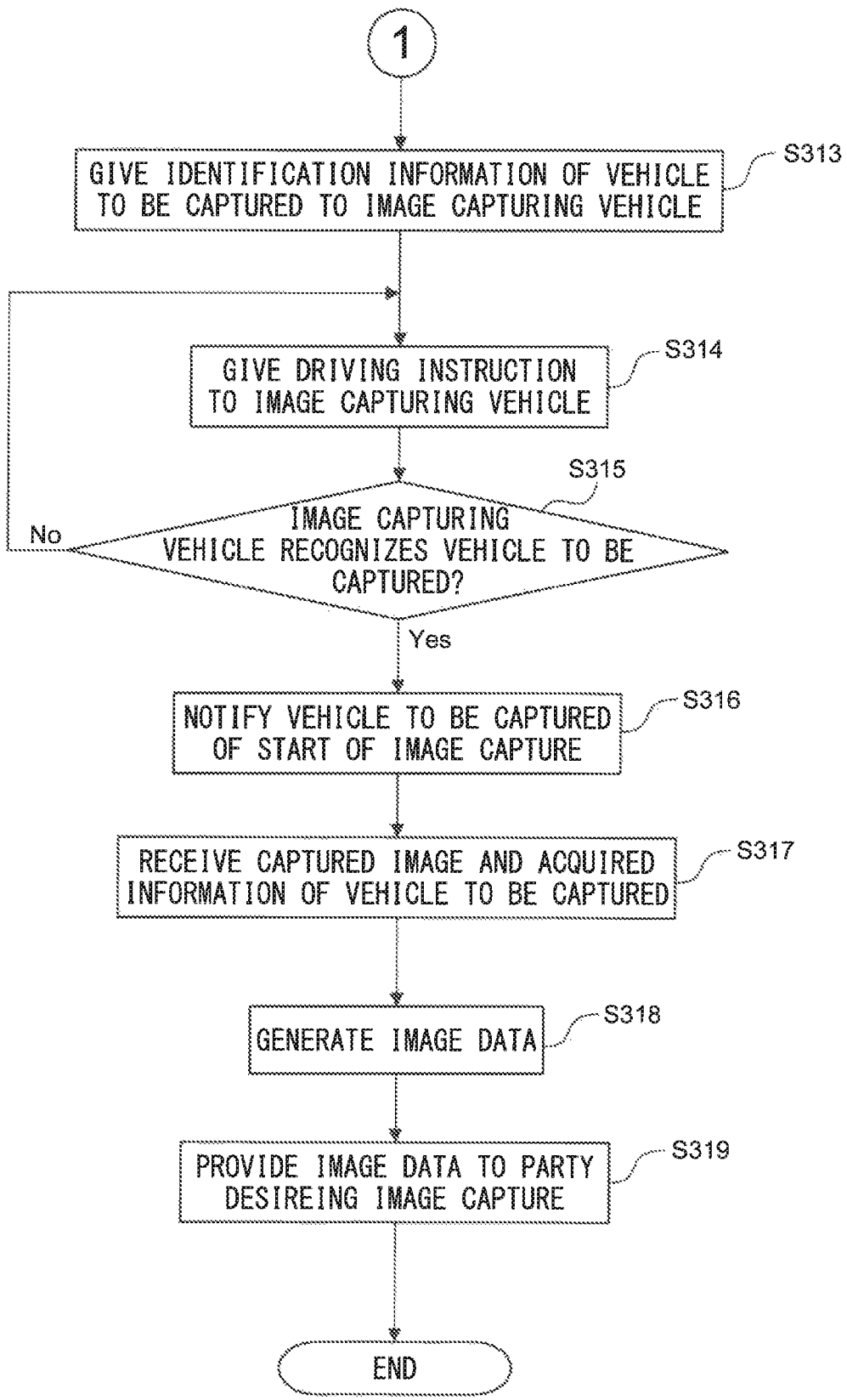
FIG. 7 is a flow chart showing a control routine of processing performed by a server when image data is generated in accordance with an image capture request.

FIG. 6 and FIG. 7 show a flow chart showing a control routine of processing performed by the server 2 when image data is generated in response to an image capture request. The present control routine is performed by the processor 24 of the server 2.

First, at step S301, the processor 24 judges whether capture request information has been received from the party desiring image capture. When it is judged that capture request information has not been received, the present control routine ends. On the other hand, when it is judged that capture request information has been received, the present control routine proceeds to step S302.

At step S302, the processor 24 judges whether the party desiring image capture desires the image of his own vehicle to be captured based on the capture request information (specifically the designation of the vehicle to be captured). If it is judged that the party desiring image capture desires an image of his own vehicle be captured, the present control routine proceeds to step S303.

At step S303, the processor 24 judges whether the necessary number of registered vehicles are in a predetermined range based on the positional information of the registered vehicles stored in the storage device 22. The predetermined range is, for example, a range where the distance to the vehicle to be captured (the vehicle of the party desiring image capture) is equal to or less than a predetermined value and the road is the same as the vehicle to be captured. Further, if the party desiring image capture desires an image of his own vehicle be captured, the necessary number is the desired number of image capturing vehicles included in the capture request information. Note that, at this time, the vehicle to be captured is excluded from the registered vehicles.

If at step S303 it is judged that the necessary number of registered vehicles are present in the predetermined range, the present control routine proceeds to step S304. At step S304, the processor 24 selects the desired number of image capturing vehicles from the registered vehicles. At this time, the processor 24, for example, selects the desired number of image capturing vehicles in order from the registered vehicle closest in distance to the vehicle to be captured.

Next, at step S305, the processor 24 requests capture cooperation to the selected image capturing vehicles. Specifically, the processor 24 transmits a notification of request for capture cooperation to the terminals of the selected image capturing vehicles through the communication interface 21 and the communication network 4.

Next, at step S306, the processor 24 judges whether the image capturing vehicles have been secured. The processor 24 receives notifications of permission of capture cooperation from the terminals of the image capturing vehicles through the communication network 4 and communication interface 21 and judges that the image capturing vehicles have been secured if the number of notifications of permission reaches the required number. If it is judged that the image capturing vehicles have been secured, the image capturing vehicles are determined and the present control routine proceeds to step S313.

On the other hand, if at step S306 it is judged that the image capturing vehicles have not been secured, the present control routine returns to step S303. In this case, the vehicles rejecting capture cooperation are removed from the registered vehicles. If at step S303 it is judged that the necessary number or more of registered vehicles are not available in a predetermined range, the present control routine proceeds to step S312.

At step S312, the processor 24 notifies the fact of image capture being impossible to the party desiring image capture. Specifically, the processor 24 transmits a notification of impossibility of image capture through the communication interface 21 and the communication network 4 to the terminal of the vehicle of the party desiring image capture. At this time, a notification of impossibility of image capture and the number of insufficient image capturing vehicles may be transmitted to the terminal of the vehicle of the party desiring image capture. After step S312, the present control routine ends.

Further, if at step S302 it is judged that the party desiring image capture desires the image of another vehicle be captured, the present control routine proceeds to step S307. At step S307, the processor 24 judges whether the vehicle to be captured is a registered vehicle. The processor 24 checks the identification information of the vehicle to be captured included in the capture request information against the identification information of registered vehicles stored in the storage device 22. The processor 24 judges that the vehicle to be captured is a registered vehicle if the identification information of the vehicle to be captured matches one of the identification information of the registered vehicles, and judges that the vehicle to be captured is not a registered vehicle if the identification information of the vehicle to be captured does not match any identification information of the registered vehicles. If it is judged that the vehicle to be captured is a registered vehicle, the present control routine proceeds to step S308.

At step S308, the processor 24 request capture cooperation to the vehicle to be captured. Specifically, the processor 24 transmits a notification of a request for capture cooperation to the terminal of the vehicle to be captured through the communication interface 21 and the communication network 4. Next, at step S309, the processor 24 judges whether the vehicle to be captured has permitted capture cooperation. Specifically, the processor 24 judges that the vehicle to be captured has permitted capture cooperation if receiving a notification of permission for capture cooperation from the terminal of the vehicle to be captured through the communication network 4 and communication interface 21, and judges that the vehicle to be captured has rejected capture cooperation if not receiving a notification of permission. If it is judged that the vehicle to be captured has permitted capture cooperation, the present control routine proceeds to step S310.

At step S310, the processor 24 judges whether the desired number of image capturing vehicles included in the capture request information is equal to or more than two. That is, the processor 24 judges whether an image capturing vehicle other than the vehicle of the party desiring image capture is required. If it is judged that the desired number of the image capturing vehicles is one, the present control routine proceeds to step S311. At step S311, the processor 24 selects the vehicle of the party desiring image capture as the image capturing vehicle. In this case, the image capturing vehicle is determined and the present control routine proceeds to step S313.

On the other hand, if at step S310 it is judged that the desired number of vehicles is equal to or more than two, the present control routine proceeds to step S303 and, as explained above, step S303 to step S306 are performed. Note that, in this case, the vehicle of the party desiring image capture functions as an image capturing vehicle, so the required number is the desired number of vehicles minus 1. Further, if at step S306 it is judged that the image capturing vehicles have been secured, the vehicle of the party desiring image capture is added to the image capturing vehicles and the image capturing vehicles are determined.

Further, if at step S307 it is judged that the vehicle to be captured is not a registered vehicle and if at step S309 it is judged that the vehicle to be captured has rejected capture cooperation, the present control routine proceeds to step S312. At step S312, the processor 24 notifies the fact of image capture being impossible to the party desiring image capture. After step S312, the present control routine ends.

At step S313, the processor 24 gives the identification information of the vehicle to be captured to an image capturing vehicle. Specifically, the processor 24 transmits the identification information of the vehicle to be captured to the terminal of the image capturing vehicle through the communication interface 21 and the communication network 4. Next, at step S314, the processor 24 gives driving instructions to the image capturing vehicle so that the image capturing vehicle can recognize the vehicle to be captured based on the positional information of the vehicle to be captured and the image capturing vehicle stored in the storage device 22. Specifically, the processor 24 transmits driving instructions to the terminal of the image capturing vehicle through the communication interface 21 and the communication network 4 based on the positional information of the vehicle to be captured and the image capturing vehicle so that the distance between the image capturing vehicle and the vehicle to be captured becomes shorter.

Next, at step S315, the processor 24 judges whether the image capturing vehicle has recognized the vehicle to be captured. The processor 24 judges that the image capturing vehicle has recognized the vehicle to be captured when receiving a notification of completion of recognition through the communication network 4 and communication interface 21 from the terminal of the image capturing vehicle. If it is judged that the image capturing vehicle has not recognized the vehicle to be captured, the present control routine returns to step S314. On the other hand, if it is judged that the image capturing vehicle has recognized the vehicle to be captured, the present control routine proceeds to step S316. Therefore, the processor 24 gives the image capturing vehicle driving instructions until the image capturing vehicle recognizes the vehicle to be captured.

At step S316, the processor 24 notifies the vehicle to be captured of the start of image capture. Specifically, the processor 24 transmits a notification of start of image capture through the communication interface 21 and the communication network 4 to the terminal of the vehicle to be captured.

Next, at step S317, the processor 24 receives captured images of the vehicle to be captured from the terminals of the image capturing vehicles through the communication network 4 and communication interface 21 and receives information acquired at the vehicle to be captured from the terminal of the vehicle to be captured through the communication network 4 and communication interface 21.

Next, at step S318, the processor 24 edits the captured images of the vehicle to be captured and the information acquired at the vehicle to be captured to generate image data. Next, at step S319, the processor 24 provides image data to the party desiring image capture. Specifically, the server 2 sends image data to the terminal of the vehicle of the party desiring image capture through the communication interface 21 and the communication network 4. After step S319, the present control routine ends.

Note that, at step S314, the processor 24 may provide driving instructions to the image capturing vehicles and the vehicle to be captured. Further, the processor 24 may provide driving instructions to the image capturing vehicles or the image capturing vehicles and the vehicle to be captured until the image capture operation of the vehicle to be captured ends.

Further, if notification of start of image capture is directly transmitted by vehicle-vehicle communication from an image capturing vehicle to the vehicle to be captured, step S316 is omitted. Further, between step S316 and step S317, the processor 24 may transmit a notification of end of image capture through the communication interface 21 and the communication network 4 to the terminals of the image capturing vehicle and the vehicle to be captured when the desired time of image capture elapses from when the image capture operation of the vehicle to be captured is started.

Further, at step S317, the processor 24 may receive only the captured images of the vehicle to be captured. In this case, at step 318, the processor 24 generates image data based on only the captured images of the vehicle to be captured. Further, at step S319, the processor 24 may store the image data in the storage device 22 or transmit the image data to a cloud server other than the server 2 through the communication interface 21 and the communication network 4 to thereby provide the party desiring image capture with the image data.

Second Embodiment

The server, vehicle image capturing system, and vehicle image capturing method according to the second embodiment are basically the same as the server, vehicle image capturing system, and vehicle image capturing method according to the first embodiment except for the points explained below. For this reason, below, the second embodiment of the present invention will be explained centered on points different from the first embodiment.

If capture cooperation for acquiring a desired vehicle image is performed for free, only the party desiring image capture would enjoy the benefits, and capture of images of vehicles based on image capture requests would not be promoted. For this reason, in the second embodiment, the processor 24 of the server 2 processes payment between a capture cooperating vehicle cooperating in the image capture operation of the vehicle to be captured and the vehicle of the party desiring image capture. By doing this, it is possible to promote the capture of images of vehicles based on image capture requests. If the party desiring image capture desires capture of an image of his own vehicle, an image capturing vehicle corresponds to the "capture cooperating vehicle". On the other hand, if the party desiring image capture desires capture of an image of another vehicle, the vehicle to be captured and an image capturing vehicle other than the vehicle of the party desiring image capture correspond to the "capture cooperating vehicles".

In the second embodiment, the storage device 22 stores points held by the registered vehicles in addition to the identification information and positional information of the registered vehicles. These points have economic value and are used for processing payment between the vehicle of the party desiring image capture and a capture cooperating vehicle. The owners of the registered vehicles can use the points to obtain various services. Further, the owners of the registered vehicles can acquire points by processing of money deposited using terminals of the vehicles. Note that, the points may be convertible to cash. For example, the points may be virtual currency. Further, the registered vehicles may be given predetermined points in advance.

Figure 8:
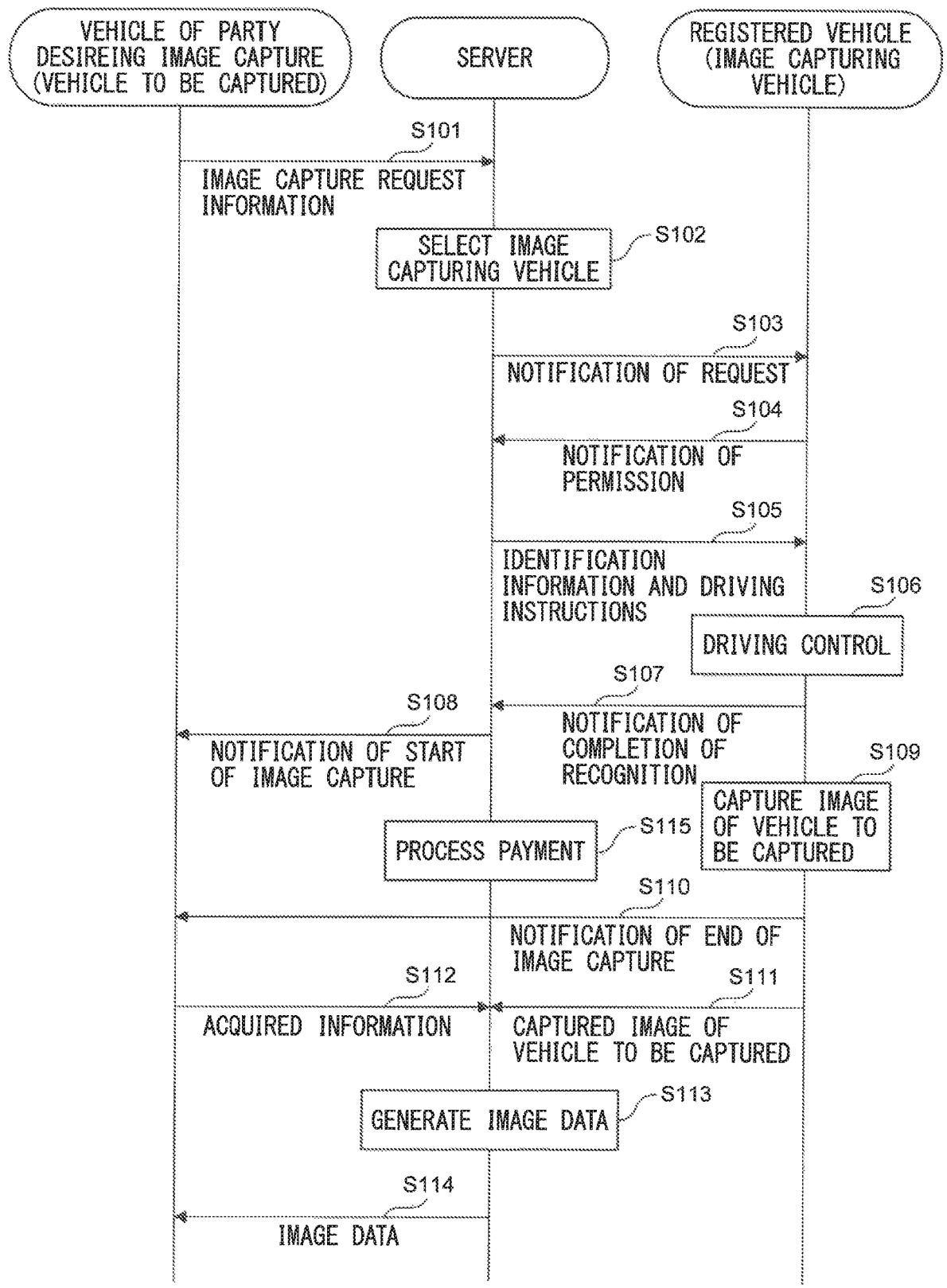
FIG. 8 is a sequence diagram showing an example of operation of a vehicle image capturing system according to a second embodiment of the present invention.

FIG. 8 is a sequence diagram showing an example of operation of a vehicle image capturing system 1 according to a second embodiment of the present invention. In the example of FIG. 8, in the same way as the example of FIG. 2, the party desiring image capture desires that another vehicle capture an image of its own vehicle when being driven. That is, the vehicle of the party desiring image capture corresponds to the "vehicle to be captured", while the vehicle of other than the party desiring image capture corresponds to the "image capturing vehicle". Further, the image capturing vehicle corresponds to a "capture cooperating vehicle".

In the processing shown in FIG. 8, step S101 to step S114 are performed in the same way as the processing shown in FIG. 2. In the processing shown in FIG. 8, the server 2 transmits a notification of start of image capture to the terminal of the vehicle to be captured, then processes payment between the vehicle of the party desiring image capture and a capture cooperating vehicle (step St 15). The server 2 receives payment from the vehicle of the party desiring image capture and gives at least a part of the received payment as compensation to the capture cooperating vehicle. For example, the server 2 receives an amount of compensation to be given to the capture cooperating vehicle plus an intermediary fee from the vehicle of the party desiring image capture. The intermediary fee is given to the manager of the server 2 through the server 2.

The server 2 processes payment by updating the held points of the vehicle of the party desiring image capture and the capture cooperating vehicle. Specifically, the server 2 adds the acquired points corresponding to the compensation to the held points of the capture cooperating vehicle so as to update the held points of the capture cooperating vehicle. Further, the server 2 subtracts the points of the acquired points plus intermediary points corresponding to the intermediary fee from the held points of the vehicle of the party desiring image capture to update the held points of the vehicle of the party desiring image capture.

Note that, the processing shown in FIG. 8 can be modified in the same way as the processing shown in FIG. 2. Further, the server 2 may change the compensation given to a capture cooperating vehicle in accordance with at least one of the quality and quantity of the captured images of the vehicle to be captured. In this case, the server 2 changes the acquired points in accordance with at least one of the quality and quantity of the captured images of the vehicle to be captured. The quality of the captured images of the vehicle to be captured is for example the resolution of the captured images. The quantity of the captured images of the vehicle to be captured is for example the time of the image capture operation of the vehicle to be captured.

Further, the timing of processing of payment may be another timing. For example, the server 2 may transmit the image data to the terminal of the vehicle of the party desiring image capture, then process payment. Further, the held points of the registered vehicles may be stored in the terminals of the registered vehicles and payment may be processed directly by vehicle-vehicle communication between the vehicle of the party desiring image capture and the capture cooperating vehicle.

Figure 9:
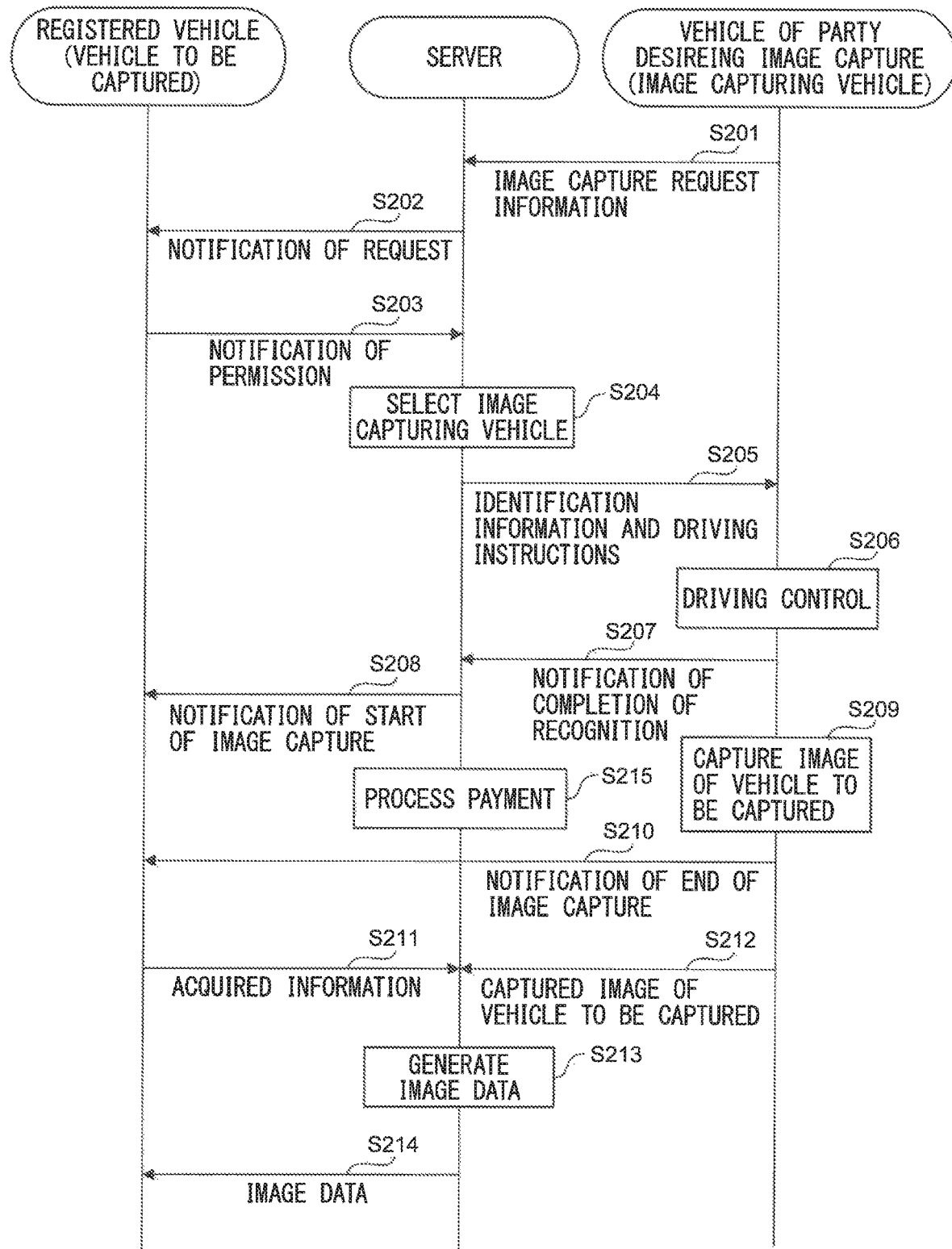
FIG. 9 is a sequence diagram showing another example of operation of a vehicle image capturing system according to the second embodiment of the present invention.

FIG. 9 is a sequence diagram showing another example of the operation of a vehicle image capturing system 1 according to a second embodiment of the present invention. In the example of FIG. 9, in the same way as the example of FIG. 5, the party desiring image capture desires his own vehicle capture an image of another driven vehicle. That is, the vehicle of the party desiring image capture corresponds to an "image capturing vehicle", while a vehicle of other than the party desiring image capture corresponds to the "vehicle to be captured". Further, the vehicle to be captured corresponds to a "capture cooperating vehicle".

In the processing shown in FIG. 9, in the same way as the processing shown in FIG. 5, step S201 to step S214 are performed. In the processing shown in FIG. 9, the server 2, in the same way as the processing shown in FIG. 8, transmits a notification of start of image capture to the terminal of the vehicle to be captured, then processes payment between the vehicle of the party desiring image capture and the capture cooperating vehicle (step S215). Note that, the processing shown in FIG. 9 can be modified in the same way as the processing shown in FIG. 2 and FIG. 8.

Figure 10:
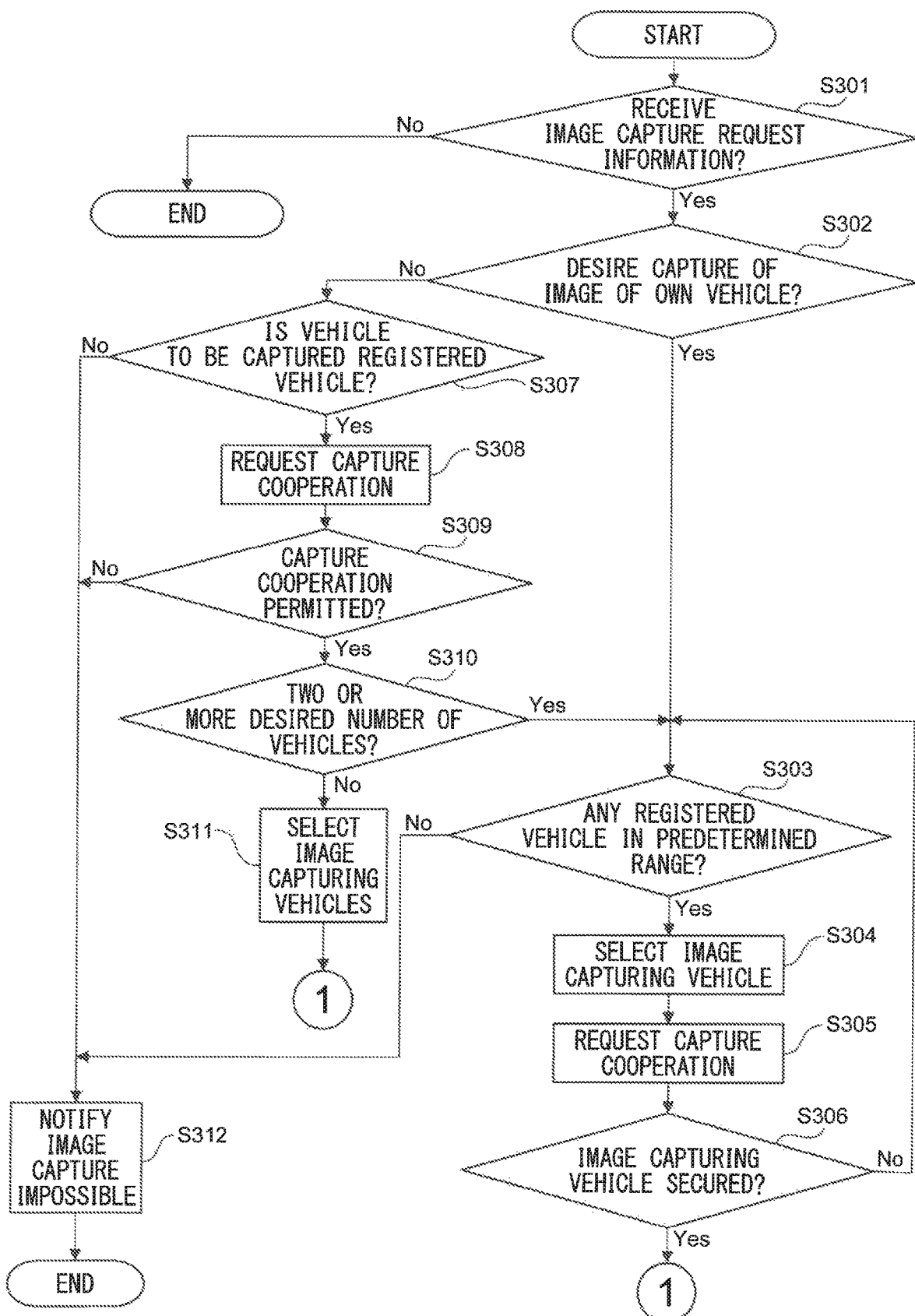
FIG. 10 is a flow chart showing a control routine of processing performed by a server when image data is generated in accordance with an image capture request.
Figure 11:
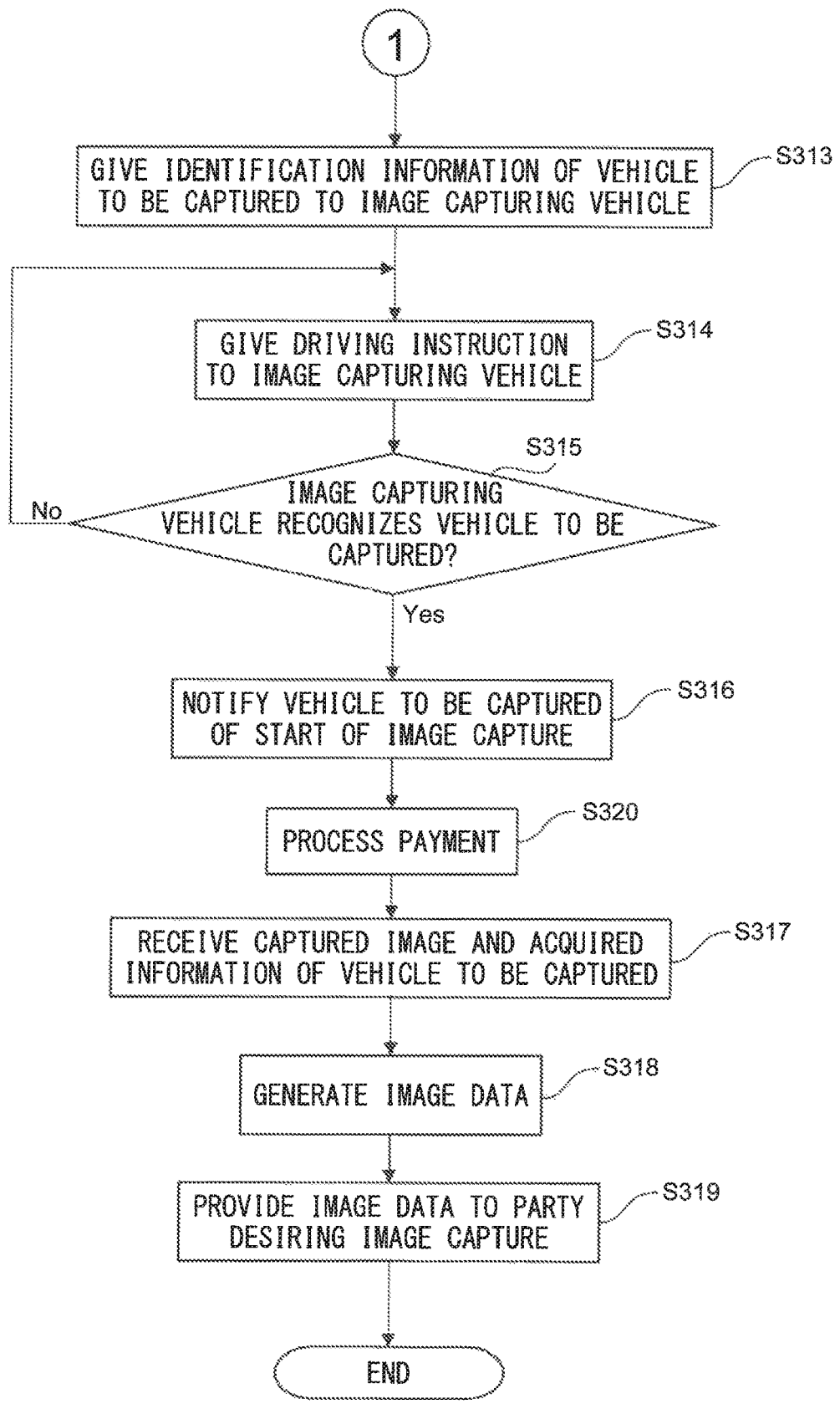
FIG. 11 is a flow chart showing a control routine of processing performed by a server when image data is generated in accordance with an image capture request.

FIG. 10 and FIG. 11 are a flow chart showing a control routine of processing performed by the server 2 when image data is generated in accordance with an image capture request. The present control routine is performed by the processor 24 of the server 2. In the present control routine, step S301 to step S319 are performed in the same way as the control routine shown in FIG. 6 and FIG. 7.

In the present control routine, at step S320 between step S316 and step S317, the processor 24 processes payment between the vehicle of the party desiring image capture and the capture cooperating vehicle. Specifically, the processor 24 adds the acquired points to the held points of the capture cooperating vehicle stored in the storage device 22 so as to update the held points of the capture cooperating vehicle. Further, the processor 24 subtracts the points of the acquired points plus intermediary points from the held points of the vehicle of the party desiring image capture stored in the storage device 22 to update the held points of the vehicle of the party desiring image capture.

Note that, the present control routine can be modified in the same way as the control routine shown in FIG. 6 and FIG. 7. Further, at step S320, the processor 24 may change the acquired points in accordance with at least one of the quality and quantity of the captured images of the vehicle to be captured. Further, the timing of processing of payment may be another timing as well. For example, the processor 24 may process payment after step S319.

Further, a point management server other than the server 2 able to communicate with the server 2 through the communication network 4 may store points held by the registered vehicles. In this case, at step S320, the processor 24 may notify the identification numbers of the vehicle of the party desiring image capture and capture cooperating vehicle to the point management server and have the point management server process payment.

Above, preferred embodiments according to the present invention were explained, but the present invention is not limited to these embodiments. Various corrections and changes may be made within the language of the claims.

REFERENCE SIGNS LIST 1 vehicle image capturing system
2 server
21 communication interface
22 storage device
23 memory
24 processor
3 vehicle
31 terminal
32 front camera
33 cabin camera
34 rear camera

The invention claimed is:
1. A server comprising:
  a communication device configured to communicate with terminals of a plurality of vehicles;
  a storage device storing identification information and positional information of the plurality of vehicles; and
  a control device configured to:
    receive capture request information input to the terminal by a party desiring image capture;
    select an image capturing vehicle for capturing an image of a vehicle to be captured designated by the party desiring image capture from among the plurality of vehicles based on the capture request information, the identification information of a vehicle of the party desiring the image capture and the positional information, the vehicle to be captured in the image being the a vehicle of the party desiring the image capture;
    generate image data based on a captured image of the vehicle to be captured acquired by a vehicle-mounted camera of the image capturing vehicle;
    provide the image data to the party desiring image capture,
    wherein the image capturing vehicle captures the image of the vehicle of the party desiring the image capture in accordance with an image capture request of the party desiring image capture;
    give a driving instruction to the image capturing vehicle so that the image capturing vehicle recognizes the vehicle to be captured; and instruct the image capturing vehicle to: accelerate within a legal speed limit in order to capture an image of the vehicle to be captured, which is running at a front of the image capturing vehicle; or decelerate in order to capture an image of the vehicle to be captured, which is running at a rear of the image capturing vehicle.

2. The server according to claim 1, wherein the control device is configured to process payment between a capture cooperating vehicle cooperating with an image capture operation of the vehicle to be captured and the vehicle of the party desiring image capture.

3. The server according to claim 1, wherein the control device is configured to process payment between a capture cooperating vehicle cooperating with an image capture operation of the vehicle to be captured and the vehicle of the party desiring image capture.

4. The server according to claim 2, wherein the control device is configured to change compensation given to the capture cooperating vehicle in accordance with at least one of a quality and quantity of captured images of the vehicle to be captured.

5. The server according to claim 3, wherein the control device is configured to change compensation given to the capture cooperating vehicle in accordance with at least one of a quality and quantity of captured images of the vehicle to be captured.

6. The server according to claim 1, wherein the control device is configured to edit a captured image of the vehicle to be captured and information acquired at the vehicle to be captured when the vehicle to be captured is captured by the vehicle-mounted camera of the image capturing vehicle to generate the image data.

7. The server according to claim 1, wherein the control device is configured to edit a captured image of the vehicle to be captured and information acquired at the vehicle to be captured when the vehicle to be captured is captured by the vehicle-mounted camera of the image capturing vehicle to generate the image data.

8. The server according to claim 2, wherein the control device is configured to edit a captured image of the vehicle to be captured and information acquired at the vehicle to be captured when the vehicle to be captured is captured by the vehicle-mounted camera of the image capturing vehicle to generate the image data.

9. The server according to claim 3, wherein the control device is configured to edit a captured image of the vehicle to be captured and information acquired at the vehicle to be captured when the vehicle to be captured is captured by the vehicle-mounted camera of the image capturing vehicle to generate the image data.

10. The server according to claim 4, wherein the control device is configured to edit a captured image of the vehicle to be captured and information acquired at the vehicle to be captured when the vehicle to be captured is captured by the vehicle-mounted camera of the image capturing vehicle to generate the image data.

11. The server according to claim 5, wherein the control device is configured to edit a captured image of the vehicle to be captured and information acquired at the vehicle to be captured when the vehicle to be captured is captured by the vehicle-mounted camera of the image capturing vehicle to generate the image data.

12. The server according to claim 6, wherein the information includes an interior image of the vehicle to be captured acquired by the vehicle-mounted camera of the vehicle to be captured.

13. The server according to claim 1, wherein the control device is configured to select two vehicles other than the vehicle to be captured as the image capturing vehicles.

14. A vehicle image capturing system comprising:
a plurality of vehicles, each vehicle being equipped with a vehicle-mounted camera and a terminal; and
a server comprising:
    a communication device configured to communicate with terminals of a plurality of vehicles,
    a storage device storing identification information and positional information of the plurality of vehicles, and
    a control device, the control device being configured to:
        receive capture request information input to the terminal by a party desiring image capture;
        select an image capturing vehicle for capturing an image of a vehicle to be captured designated by the party desiring image capture from among the plurality of vehicles based on the capture request information, the identification information of a vehicle of the party desiring the image capture and the positional information, the vehicle to be captured in the image being the a vehicle of the party desiring the image capture;
        generate image data based on a captured image of the vehicle to be captured acquired by the vehicle-mounted camera of the image capturing vehicle;
        provide the image data to the party desiring image capture, wherein
        the image capturing vehicle captures the image of the vehicle of the party desiring the image capture in accordance with an image capture request of the party desiring image capture;
        give a driving instruction to the image capturing vehicle so that the image capturing vehicle recognizes the vehicle to be captured; and
        instruct the image capturing vehicle to: accelerate within a legal speed limit in order to capture an image of the vehicle to be captured, which is running at a front of the image capturing vehicle; or decelerate in order to capture an image of the vehicle to be captured, which is running at a rear of the image capturing vehicle.

15. A vehicle image capturing method comprising:
storing identification information and positional information of a plurality of vehicles;
receiving capture request information input to a terminal of a vehicle by a party desiring image capture;
selecting an image capturing vehicle for capturing an image of a vehicle to be captured designated by the party desiring image capture from among the plurality of vehicles based on the capture request information, the identification information of a vehicle of the party desiring the image capture and the positional information, the vehicle to be captured in the image being the a vehicle of the party desiring the image capture;
generating image data based on a captured image of the vehicle to be captured acquired by a vehicle-mounted camera of the image capturing vehicle;
providing the image data to the party desiring image capture,
wherein the image capturing vehicle captures the image of the vehicle of the party desiring the image capture in accordance with an image capture request of the party desiring image capture;

giving a driving instruction to the image capturing vehicle so that the image capturing vehicle recognizes the vehicle to be captured; and instructing the image capturing vehicle to: accelerate within a legal speed limit in order to capture an image of the vehicle to be captured, which is running at a front of the image capturing vehicle; or decelerate in order to capture an image of the vehicle to be captured, which is running at a rear of the image capturing vehicle.

16. The server according to claim 1, wherein the image capturing vehicle is an automated driving vehicle, and a driving actuator of the image capturing vehicle is controlled in accordance with the driving instruction.

\* \* \* \* \*